US012748046B2

(12) United States Patent
Keefe et al.

(10) Patent No.: US 12,748,046 B2
(45) Date of Patent: Sep. 29, 2026

(54) METHOD AND APPARATUS FOR DETERMINING A FORCE APPLIED TO A SAMPLE DURING AN OPTICAL INTERROGATION TECHNIQUE

(71) Applicant: Thermo Electron Scientific Instruments LLC, Madison, WI (US)

(72) Inventors: William Robert Keefe, Oconomowoc, WI (US); Gang Feng, Verona, WI (US); Min Yan, Verona, WI (US); William Bayer, Black Earth, WI (US); Peter Steinberg, Madison, WI (US)

(73) Assignee: Thermo Electron Scientific Instruments LLC

( * ) Notice: Subject to any disclaimer, the term of this patent is extended or adjusted under 35 U.S.C. 154(b) by 190 days.

(21) Appl. No.: 18/668,978

(22) Filed: May 20, 2024

(65) Prior Publication Data

US 2024/0310277 A1 Sep. 19, 2024

Related U.S. Application Data

(63) Continuation of application No. 17/812,512, filed on Jul. 14, 2022, now Pat. No. 12,019,014.

(Continued)

(51) Int. Cl.

| | |
|---|---|
| ***G01N 21/35*** | (2014.01) |
| ***G01L 1/22*** | (2006.01) |
| ***G01N 21/3563*** | (2014.01) |

(52) U.S. Cl.

CPC ............ *G01N 21/3563* (2013.01); *G01L 1/22* (2013.01); *G01N 2201/0634* (2013.01)

(58) Field of Classification Search

CPC ........ G01N 21/3563; G01N 2201/0634; G01L 1/22

See application file for complete search history.

(56) References Cited

U.S. PATENT DOCUMENTS 5,581,085 A 12/1996 Reffner et al.
5,939,709 A 8/1999 Ghislain et al.

(Continued)

FOREIGN PATENT DOCUMENTS

CN 101479638 A 7/2009
CN 105424229 A 3/2016

(Continued)

OTHER PUBLICATIONS

English Translation of the Notification of the First Office Action issued in Chinese Patent Application No. 202210841794.9 dated Aug. 17, 2024.

*Primary Examiner* — Hugh Maupin
(74) *Attorney, Agent, or Firm* — Leron Vandsburger

(57) ABSTRACT

An optical measurement system measurement system for examining a sample. The measurement system comprises an internally reflective element, a stage, an optical assembly, a chassis, and a sensor. The internally reflective element has a contact surface. The stage is positioned below the internally reflective element. The stage and the internally reflective element are configured to apply a force to the sample. The optical assembly comprises a light source and a light detector. The optical assembly is configured to scan the sample by directing source light from the light source towards the contact surface and detecting source light optically interacting with the contact surface by the light detector. The chassis is configured to support the optical assembly and the internally reflective element. The sensor is mounted to the chassis and configured to detect the force applied to the sample by the internally reflective element and the stage.

20 Claims, 7 Drawing Sheets

Related U.S. Application Data

(60) Provisional application No. 63/222,525, filed on Jul. 16, 2021.

(56) References Cited

U.S. PATENT DOCUMENTS

| | | | | |
|---|---|---|---|---|
| 6,414,311 | B1 | 7/2002 | Wood et al. | |
| 2004/0196037 | A1 | 10/2004 | Xiang et al. | |
| 2005/0171413 | A1* | 8/2005 | Blair | A61B 5/1455 600/310 |
| 2006/0005615 | A1 | 1/2006 | Ducker et al. | |
| 2008/0285122 | A1* | 11/2008 | Hoult | G01J 3/46 359/368 |
| 2012/0262710 | A1* | 10/2012 | Aeschbach | G01N 21/552 356/244 |
| 2013/0163077 | A1* | 6/2013 | Neuberg | G01B 11/16 359/385 |
| 2014/0259234 | A1 | 9/2014 | Raschke et al. | |
| 2014/0374601 | A1 | 12/2014 | Pastore et al. | |
| 2016/0258863 | A1* | 9/2016 | Pastore | G01N 21/3563 |
| 2022/0386875 | A1* | 12/2022 | Oba | A61B 5/1455 |

FOREIGN PATENT DOCUMENTS

| | | | |
|---|---|---|---|
| CN | 105431727 | A | 3/2016 |
| CN | 105705936 | A | 6/2016 |
| CN | 107003235 | A | 8/2017 |
| CN | 110514332 | A | 11/2019 |
| JP | H6-3261 | A | 1/1994 |
| JP | 2003-35661 | A | 2/2003 |

* cited by examiner

METHOD AND APPARATUS FOR DETERMINING A FORCE APPLIED TO A SAMPLE DURING AN OPTICAL INTERROGATION TECHNIQUE

CROSS REFERENCE TO RELATED APPLICATIONS

This application is a continuation of U.S. patent application Ser. No. 17/812,512 (filed Jul. 14, 2022), which claims priority to and the benefit of U.S. Provisional Application No. 63/222,525 (filed on Jul. 16, 2021), the disclosure of which is incorporated herein by reference in its entirety for any and all purposes.

TECHNICAL FIELD

This disclosure relates generally to spectroscopy, more particularly, to an optical interrogation system and method to determine a contact force on a sample.

BACKGROUND

Attenuated total reflectance (ATR) is an optical interrogation technique often used in conjunction with infrared spectroscopy (e.g., Fourier Transform Infrared (FTIR)), which enables samples to be examined directly in a solid, liquid or a gas state. In particular, ATR capitalizes on total internal reflected light produced at the interface of a configured internally reflecting element (IRE) and a coupled sample plane. In operation, a beam of light (e.g., infrared) is passed through an IRE crystal in such a way that it reflects at least once off of the internal surface in contact with a sample. This reflection forms an evanescent wave which extends into the sample, often up to about 2 microns, with the exact value being determined by the wavelength of light, the angle of incidence and the indices of refraction for the IRE crystal and the sample medium being interrogated. The reflected beam, which carries the spectral information of the sample, is thereafter interrogated for analysis via, for example, a single pixel, linear array or 2-dimensional array detector.

The samples, primarily the solid samples to be interrogated using ATR as the investigation technique, can come in the form of many different shapes and sizes. In order to enable efficient optical coupling, a force is applied to such samples with a configured stage mechanism that is designed to provide intimate contact with an optical component, such as a Diamond, Silicon, or Germanium (Ge) ATR element. Conventional stages include pressure mechanisms that include mechanical screws, levers, slides, and actuators that are designed to apply compressive forces on a given sample.

However, when performing typical ATR measurements, repeatable and controllable force applied to the sample is required for accurate signal to noise control in ATR measurements.

The foregoing background discussion is intended solely to aid the reader. It is not intended to limit the innovations described herein. Thus, the foregoing discussion should not be taken to indicate that any particular element of a prior system is unsuitable for use with the innovations described herein, nor is it intended to indicate that any element is essential in implementing the innovations described herein.

SUMMARY

The foregoing needs are met, to a great extent, by the ATR measurement system described herein. The ATR measurement system allows the objective, ATR, and structure associated with the support to move on bearings for low resistance motion. The system can be brought into contact with a sensitive sensor (e.g., a load cell, a strain gauge) electrically attached to a low noise circuit and operational amplifier. The range of the load cell (and/or strain gauge) is restricted to allow low forces to be measured accurately and repeatedly. The sensor can have a very low deflection until failure, thus maintaining optical alignment.

The ATR measurement system can measure a force and/or a pressure on a tip of the ATR. The sensor can be combined with a high-precision low-noise analog electronic circuit to allow a more accurate measurement of the force, which can be made available to a user.

Conventional systems use a less sensitive sensor that can depend on additional force that is added to a stage supporting the sample and the sample weight. Because deflection needs to be limited on the stage, the strains should be designed to be low. This can affect the percentage strain that the gauge is able to measure. When being exposed to a low strain, the force measurement can have linearity and accuracy problems. When applying the sensor to an upper assembly, large strain may not allow for a rigid optical path. Sensor setups frequently operate with the material to be at roughly 50% strain; these sensors are typically not linear or accurate under 10% strain. Therefore, a highly accurate sensor may be too flexible for a microscope application, and a stiffer sensor design suitable for use in a microscope may not be accurate at typical ATR loads.

The ATR measurement system described herein includes a load sensor on the optical side of the system that is connected to a chassis. The system includes a hinge connection that allows substantially all of the force of the ATR contact to be measured by the sensor. The sensor has a limited range so the forces that are being measured are in the middle of a measuring range. With a fixed, constant load applied to (e.g., above) the stage supporting the sample, the entire load of the optical assembly can be supported with a fastener (e.g., from below). At this point, the hinged beam can be positioned with respect to the sample (e.g., vertically), but it can revert to the same position on the fastener. The sensor can be tared or zeroed out. The sensor can be configured to repeatedly and accurately report the load that the ATR crystal is applying to the sample during measurement.

An aspect of the present disclosure provides a measurement system for examining a sample. The measurement system can include an internally reflective element, a stage, an optical assembly, a chassis, and a sensor. The internally reflective element can include a contact surface configured to contact the sample. The stage can be positioned adjacent to (e.g., axially below) the internally reflective element. At least one of the stage and the internally reflective element can be configured to apply a force to the sample when the sample is positioned on the stage and the contact surface is in contact with the sample. The optical assembly can include a light source and a light detector. The optical assembly can be configured to scan the sample by directing source light from the light source towards the contact surface and detecting source light optically interacting with the contact surface by the light detector. The chassis can be configured to support the optical assembly and the internally reflective element. The sensor can be mounted to the chassis and configured to detect the force applied to the sample by the at least one of the internally reflective element and the stage.

Another aspect of the present disclosure provides a method for examining a sample with a measurement system.

The method can include: positioning a sample on a stage; contacting the sample by a contact surface of an internally reflective element, the internally reflective element positioned adjacent to (e.g., axially above) the stage; applying a force to the sample with at least one of the stage and the contact surface of the internally reflective element; and detecting, by a sensor, force applied to the sample. The sensor can be mounted to a chassis. The chassis can be configured to support an optical assembly adjacent to (e.g., vertically above) the stage. The optical assembly can include a light source and a light detector. The optical assembly can be configured to scan the sample by directing source light from the light source towards the contact surface and detecting source light optically interacting with the contact surface by the light detector.

This summary is provided to introduce a selection of concepts in a simplified form that are further described below in the Detailed Description section. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The foregoing summary, as well as the following detailed description of illustrative embodiments of the present application, will be better understood when read in conjunction with the appended drawings. For the purposes of illustrating the present application, there are shown in the drawings illustrative embodiments of the disclosure. It should be understood, however, that the application is not limited to the precise arrangements and instrumentalities shown. In the drawings.

DETAILED DESCRIPTION

Figure 1:
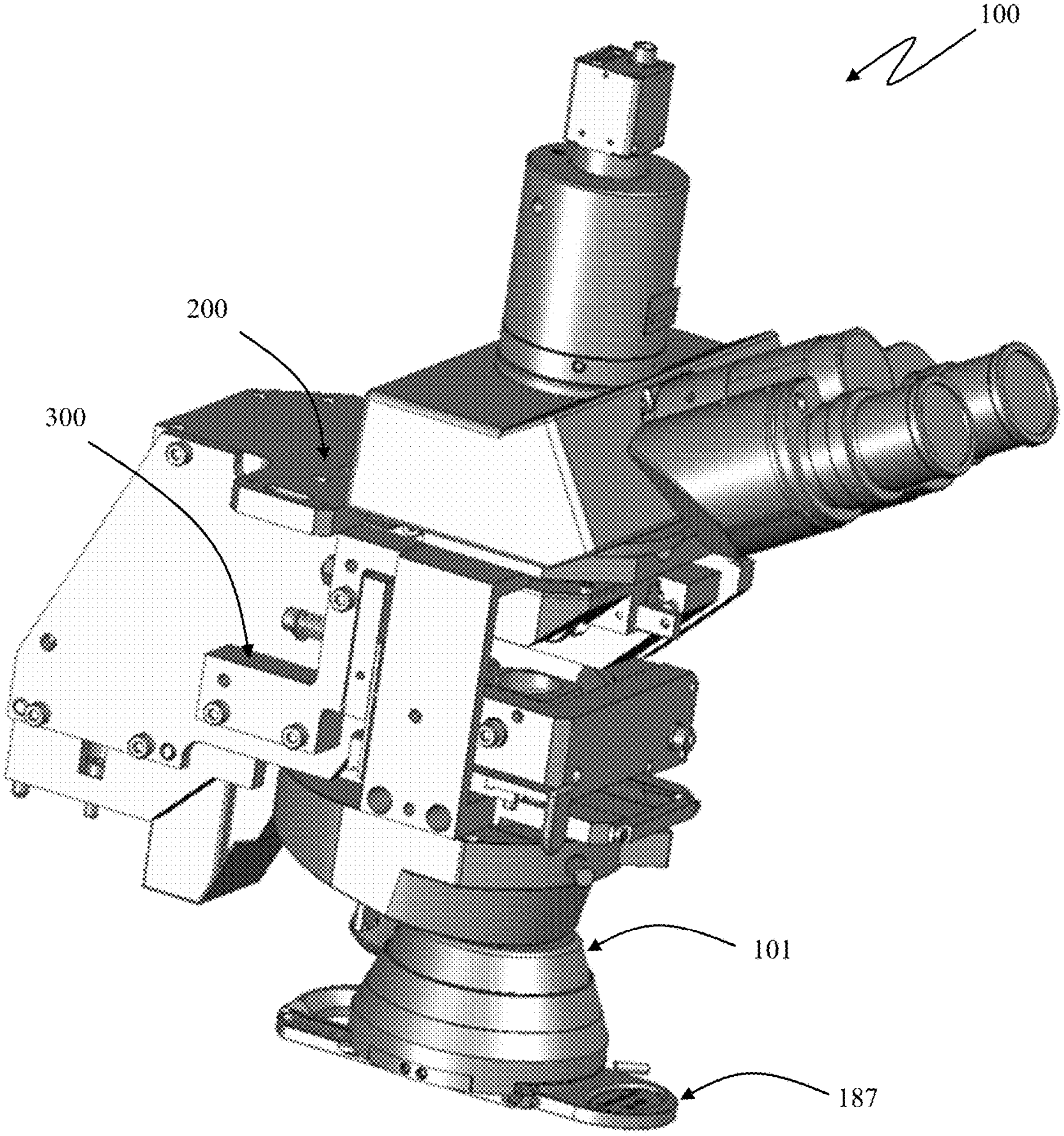
FIG. 1 illustrates a top perspective view of an ATR measurement system, according to an aspect of this disclosure.

Certain terminology used in this description is for convenience only and is not limiting. The words “axial”, “radial”, “circumferential”, “outward”, “inward”, “upper,” and “lower” designate directions in the drawings to which reference is made. As used herein, the term “substantially” and derivatives thereof, and words of similar import, when used to describe a size, shape, orientation, distance, spatial relationship, or other parameter includes the stated size, shape, orientation, distance, spatial relationship, or other parameter, and can also include a range up to 10% more and up to 10% less than the stated parameter, including 5% more and 5% less, including 3% more and 3% less, including 1% more and 1% less. All ranges disclosed herein are inclusive of the recited endpoint and independently combinable (for example, the range of “from 2 grams to 10 grams” is inclusive of the endpoints, 2 grams and 10 grams, and all the intermediate values). The terminology includes the above-listed words, derivatives thereof and words of similar import.

In Fourier Transform Infrared (FTIR) spectroscopy, the unknown substance is illuminated with a broad-spectrum of infrared light, which can be absorbed by the sample of interest. The illumination via a source can be in the wavelength range from about 0.7 microns up to 25 microns. The light intensity as a function of wavelength is measured before and after interacting with the sample, and the absorbance caused by the sample is calculated. Light is absorbed in varying amounts by the sample at particular frequencies corresponding to the vibrational frequencies of the bonds of the molecules in the sample. Since the bonds for every molecule are different, the FTIR absorption spectrum for every molecule is also different. Thus, a spectral “fingerprint” can be generated by recording the absorbance of light as a function of wavelength.

With typical ATR/FTIR instruments, the conventional pressure arrangement uses drive screws, levers, and wedges to create force and/or pressure on the materials and requires the user to manually move the mechanism. Manual movement is one way of applying the force, but the user (e.g. a tester) can manipulate a joystick to raise the stage or can use software to raise the stage to a specific location relative to the internally reflecting element (IRE). Such conventional manual (e.g., knob driven) movement of the mechanism, however, tend to be large and unwieldy, and are also difficult to manipulate in ways that apply contact force repeatably or according to desired attributes such as a desired spectroscopy signature. When testing hard samples, the force can increase by just a few microns and a manual method can be very difficult, time consuming, or both to guarantee that the interface pressure is at a preferred level.

Figure 2:
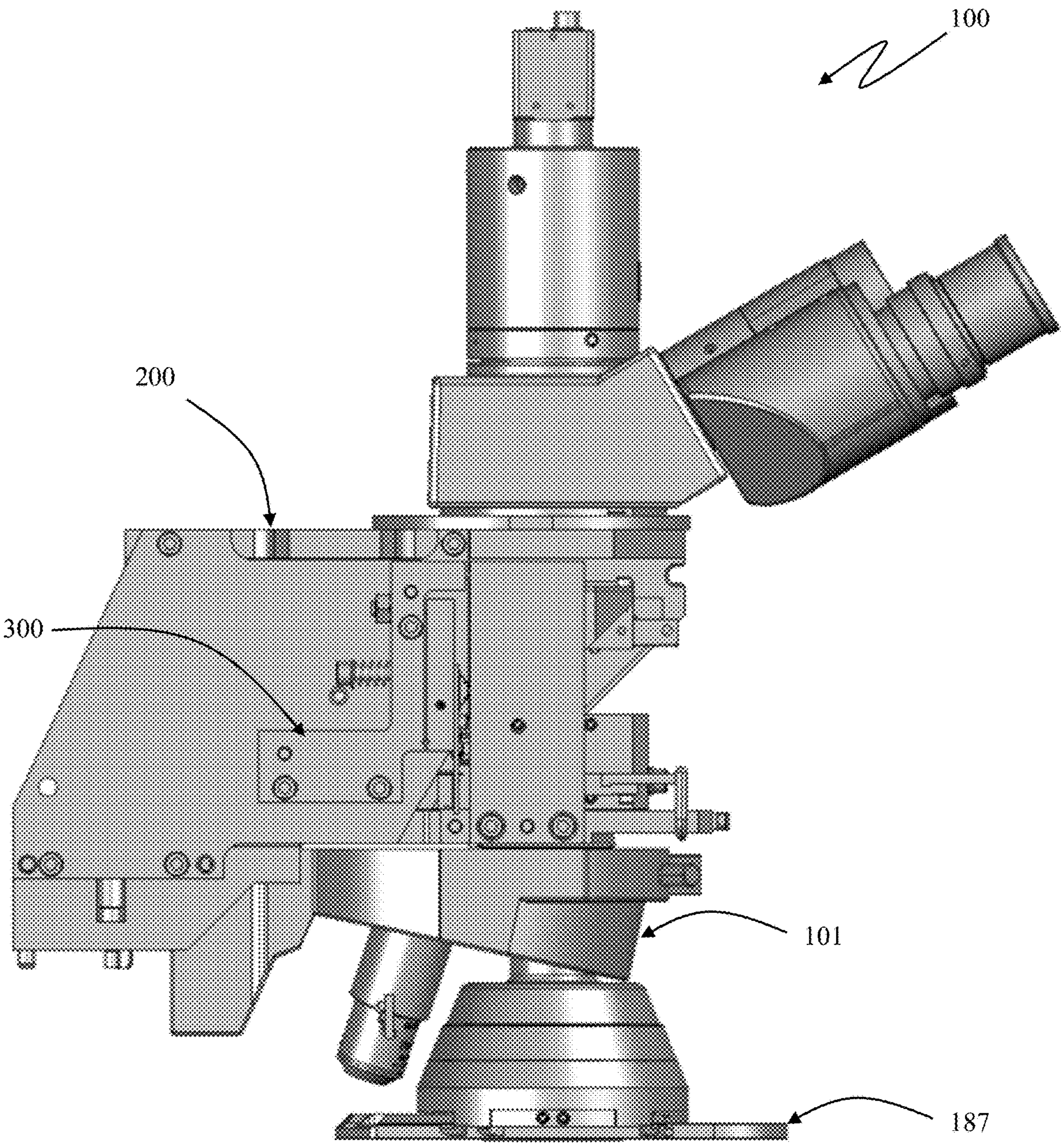
FIG. 2 illustrates a side view of the ATR measurement system shown in FIG. 1.

FIGS. 1 and 2 illustrate a perspective view and a side view of an ATR measurement system 100, according to aspects of this disclosure. The measurement system 100 can include an optical assembly 101, a chassis 200, a load measurement assembly 300, and a manual slide mechanism 187 to accurately locate an ATR crystal. The chassis 200 can support the optical assembly 101 and the load measurement assembly 300. The load measurement assembly 300 can be connected to the optical assembly 101, as further described herein. The ATR crystal slide 187 can be positioned adjacent to (e.g., below) the optical assembly 101 and can be configured to position the ATR crystal fixedly for contact with a sample material 190 (see FIG. 4) thereon. The optical assembly 101 can be configured to optically interrogate the sample material 190, as further described herein.

Figure 3:
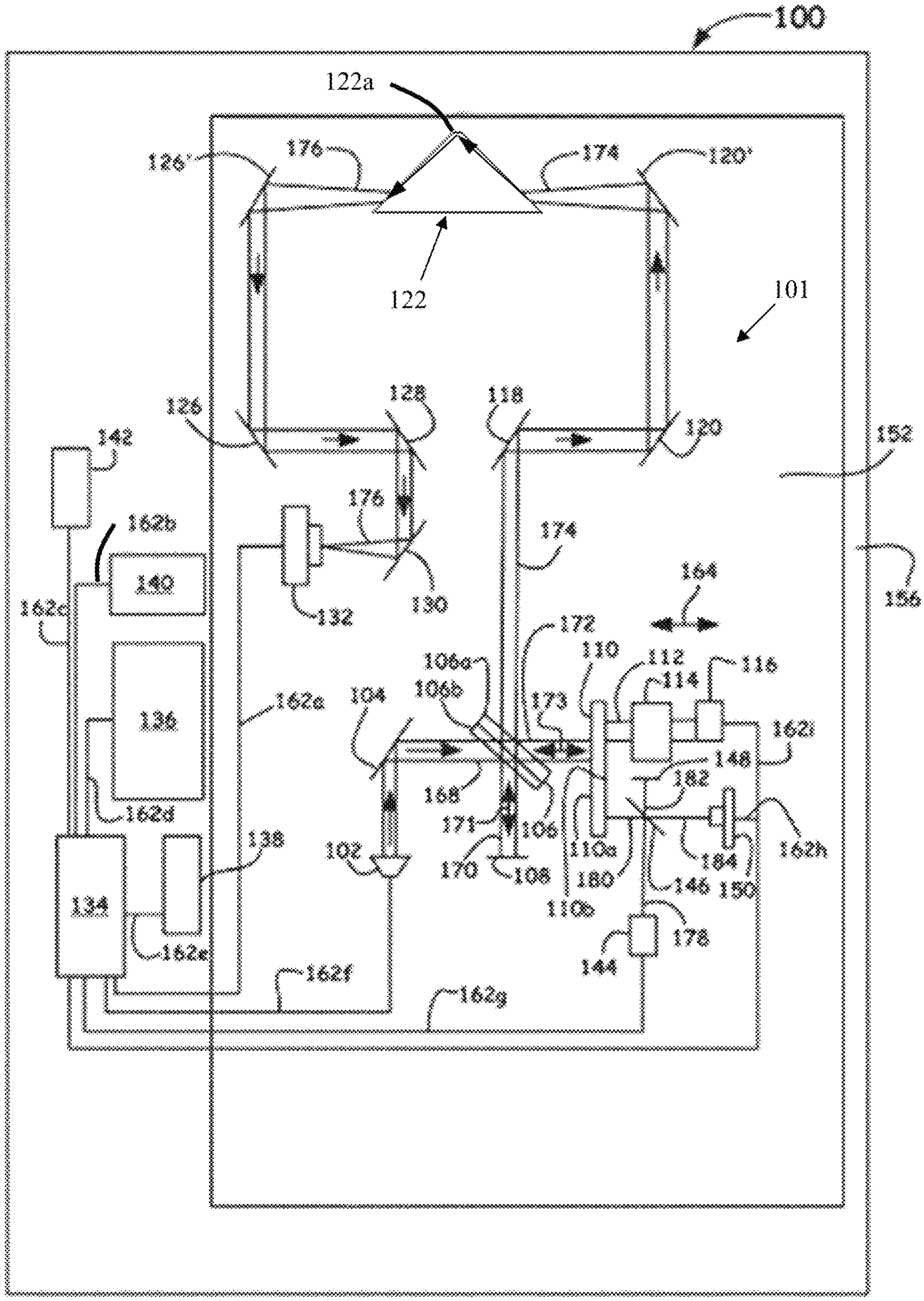
FIG. 3 illustrates a schematic of an ATR measurement system, according to an aspect of this disclosure.

FIG. 3 illustrates a schematic of an ATR measurement system 100, according to an aspect of this disclosure. The measurement system 100 can include an optical assembly 101. The optical assembly 101 can include various optical components mounted on to a chassis, such as chassis 200 of FIGS. 1 and 2. The optical components can be located within an enclosure 156. The optical assembly 101 can include radiation sources 102 and 144, mirrors 104, 108, 110, 148, 118, 120, 120', 126, 126', 128, and 130, beamsplitters 106 and 146, detectors and/or sensors 132 and 150, and an internally reflective element 122 (e.g. a prism). It will be appreciated that while mirrors 104, 108, 110, 148, 118, 120, 120', 126, 126', 128, and 130 of a certain number and as generally shown as planar in design, the mirrors and/or other optical elements can include refractive optical elements (e.g., lenses) as well as non-planar reflective elements can also be configured with other predetermined curvatures to provide the optical paths shown in FIG. 3. For example, such elements can be configured with concave, convex, parabolic, elliptical curvatures or any general surface needed to provide proper beam construction along any part of the beam paths as directed within system 100.

The optical assembly 101 can further include a shaft 112, a bushing 114, and an actuator 116 coupled to mirror 110, and an electronic processor 134, an electronic display 136 (e.g., including a flat panel display element such as a liquid crystal display element, an organic light-emitting diode display element, an electrophoretic display element, or another type of display element capable of touch-screen operation), an input device 138, a storage unit 140, and a communication interface 142. The electronic processor 134 can be in electrical communication with a light detector 132, a storage unit 140, a communication interface 142, a display 136, an input device 138, radiation sources 102 and 144, a detector 150, and an actuator 116 via communication lines 162*a-i*, respectively.

The system 100 can be configured for use as an FTIR spectrometer during operation. It will be appreciated that the system 100 can be configured for other types of spectroscopy including, for example, ultraviolet, visible, Raman, or still other types of spectroscopy. The system 100 can provide light 168 via light source 102, which can be removable for case of replacement, under the control of processor 134. The light 168 can include radiation from the light source 102, which can include a radiation source. Radiation 168 can be directed by mirror 104 to be incident on beamsplitter 106, which can be configured as a beamsplitting optical element 106*a* and a phase compensating plate 106*b* to enable the received radiation 168 to be divided into two beams. Using such a configuration can enable an interferometer (e.g., a Michelson-type interferometer) to be formed where a first beam 170 can reflect from a surface of beamsplitter 106, propagates along a beam path which is parallel to arrow 171, and is incident on fixed mirror 108. Fixed mirror 108 thereafter can reflect first beam 170 in an opposite direction so as to be now be directed towards beamsplitter 106. A second beam 172 can be transmitted through beamsplitter 106 and propagate along a beam path which is parallel to double arrow 173. Second beam 172 can be incident on a first surface 110*a* of movable mirror 110 so that upon reflection is also directed towards beamsplitter 106.

First and second beams 170 and 172 can be combined by the configuration of beamsplitter 106 and associated optics, which spatially overlaps the beams to form a beam of modulated infrared radiation beam 174 (by way of operation of the configured interferometer) and is directed towards mirror 118. Thereafter, mirrors 118, 120, 120' can direct modulated infrared radiation beam 174 to the internally reflective element 122. Once inside the internally reflective element 122 (often configured as a prism), beam of modulated infrared light 174 can be directed to an ATR tip or contact surface 122*a* of the internally reflective element 122. The contact surface 122*a* of the internally reflective element 122 can be positioned adjacent to (e.g., above) the sample 190 of interest. In some cases, the sample 190 can include irregularities in surface construction (e.g., a powder). When modulated infrared light 174 is incident on the contact surface 122*a*, a portion of the radiation of modulated infrared light 174 can be directed into the sample material 190 (See FIG. 4) through contact surface 122*a* via a desired evanescent wave effect. As part of the effect, the sample 190 can desirably absorb a portion of modulated infrared light 174 that is indicative of the structure and thus the properties of the sample material 190.

A total internal reflected portion 176 of modulated infrared light 174 can include a reduced amount of modulated radiation not absorbed by the sample 190. The reflected beam 176 can be directed through a desired surface of the internally reflective element 122 and can be thereafter directed by, for example, mirrors 126', 126, 128, and 130 in order to be interrogated by the system 100 via detection by light detector 132. In particular, under the control of processor 134, the light detector 132 can be configured to measure one or more properties of the sample 190 based on the reflected radiation in beam 176.

As stated above, the configured mirrors 108 and 110 together with beamsplitter 106 beneficially form an interferometer. In operation, by translating mirror 110 in a left-right direction (e.g. double-arrow 164) prior to each measurement, the plurality of measurements of the radiation in reflected beam 176 can form an interferogram that includes information, such as sample absorption information. The processor 134 can be configured to apply one or more mathematical transformations (e.g., a Fourier transform) to the interferogram to obtain sample absorption information.

The mirror 110 can be coupled to the shaft 112, the bushing 114, and the actuator 116. The shaft 112 can move freely within bushing 114 and a viscous fluid is often disposed between shaft 112 and bushing 114 to permit relative motion between the two. Thus, the mirror 110 can move when the actuator 116 receives control signals from the processor 134 via communication line 162*i*.

To measure the position of mirror 110, the light source 144, the beamsplitter 146, the mirror 148, and the detector 150 can be configured to measure a position of the mirror 110. These components can be arranged to form a second interferometer (e.g., a Michelson-type interferometer). During a mirror position measurement of operation, the light source 144 (e.g., a monochromatic emission source (laser)) can receive a control signal from processor 134 via the communication line 162*g*, and can generate a radiation beam 178. As an example of a desired source, light source 144 can be a configured vertical cavity surface-emitting laser (VCSEL) that generates radiation having a central wave-length of 850 nm. However, it is to be understood that source 144 can also include a wide variety of other sources, such as, laser diodes, light-emitting diodes, etc., capable of having radiation between 400 nm up to about 1200 nm.

The beam 178 can be incident on beamsplitter 146, which can separate radiation beam 178 into a first beam 180 and a second beam 182. The first beam 180 can reflect from a surface of the beamsplitter 146 and can incident on a second surface 110*b* of the mirror 110. The second surface 110*b* can be positioned opposite first surface 110*a* of the mirror 110. The first beam 180 can reflect from surface 110*b* and return to the beamsplitter 146. The second beam 182 can be transmitted through the beamsplitter 146, reflected by mirror 148, and returned to the beamsplitter 146. The beamsplitter 146 can combine (e.g., spatially overlap) reflected beams 180 and 182, and the spatially overlapped beam 184 can be directed to the detector 150. The detector 150 can receive control signals from the processor 134 via communication line 162*k*, and can be configured to measure an intensity of the combined beam 184. The combined beam 184 can provide an interference pattern that contains desired optical position information. Thus, the monitoring beam 184 can enable the position (and speed and tilt, if desired), of the mirror 110 to be precisely determined by counting the peaks and valleys in the amplitude of the beam 184.

In an aspect, absorption information can be compared by processor 134 to reference information (e.g., reference absorption information) stored in storage unit 140 to determine an identity of an unknown sample. For example, the processor 134, after a Fourier transform has been applied to the received reflected beam 176, can determine whether the absorption information for the sample matches any one or more of a plurality of sets of reference absorption information for a variety of substances that are stored as database records in the storage unit 140 or even from a database remotely located via wireless communication.

If a match is found (e.g., the sample absorption information and the reference information for a particular substance agree sufficiently), then the sample 190 is considered to be identified by processor 134. The processor 134 can send an electronic signal to display 136 along communication line 162*d* that indicates to a system operator that identification of the sample 190 was successful, and provides the name of the identified substance. If a match between the sample absorption information and the reference information is not found by processor 134, the processor 134 can send an electronic signal to display 136 that indicates to the system operator that sample 190 was not successfully identified, or that efficient optical coupling between the ATR contact surface 122*a* was not provided because of, for example, insufficient force applied by the contact member 191.

The communication interface can receive and transmit signals from/to the processor 134 via communication line 162*c*. The communication interface 142 can include a wireless transmitter/receiver unit that can be configured to transmit signals from the processor 134 to other devices, and to receive signals from other devices and communicate the received signals to the processor 134. For example, the communication interface 142 can permit the processor 134 to communicate with other devices via a wireless network that includes multiple devices connected to the network, and/or via a direct connection to another device. The processor 134 can establish a secure connection (e.g., an encrypted connection) to one or more devices to ensure that signals can only be transmitted and received by devices that are approved for use on the network.

The light source 102 can be configured as a replaceable component. The light source 102 can include a broadband radiation source configured to provide infrared radiation so that the system 100 can be operated as an infrared spectrometer. The infrared radiation provided by source 102 can include a distribution of wavelengths, with a center wavelength of the distribution of about 10 microns. In general, light source 102 can include a variety of sources known to those skilled in the art, including a heated infrared source chosen from any customized or conventional known source utilized in the field, such as, but not limited to, a wire, metal or ceramic element that is heated to emit a continuous band of optical radiation.

Figure 4:
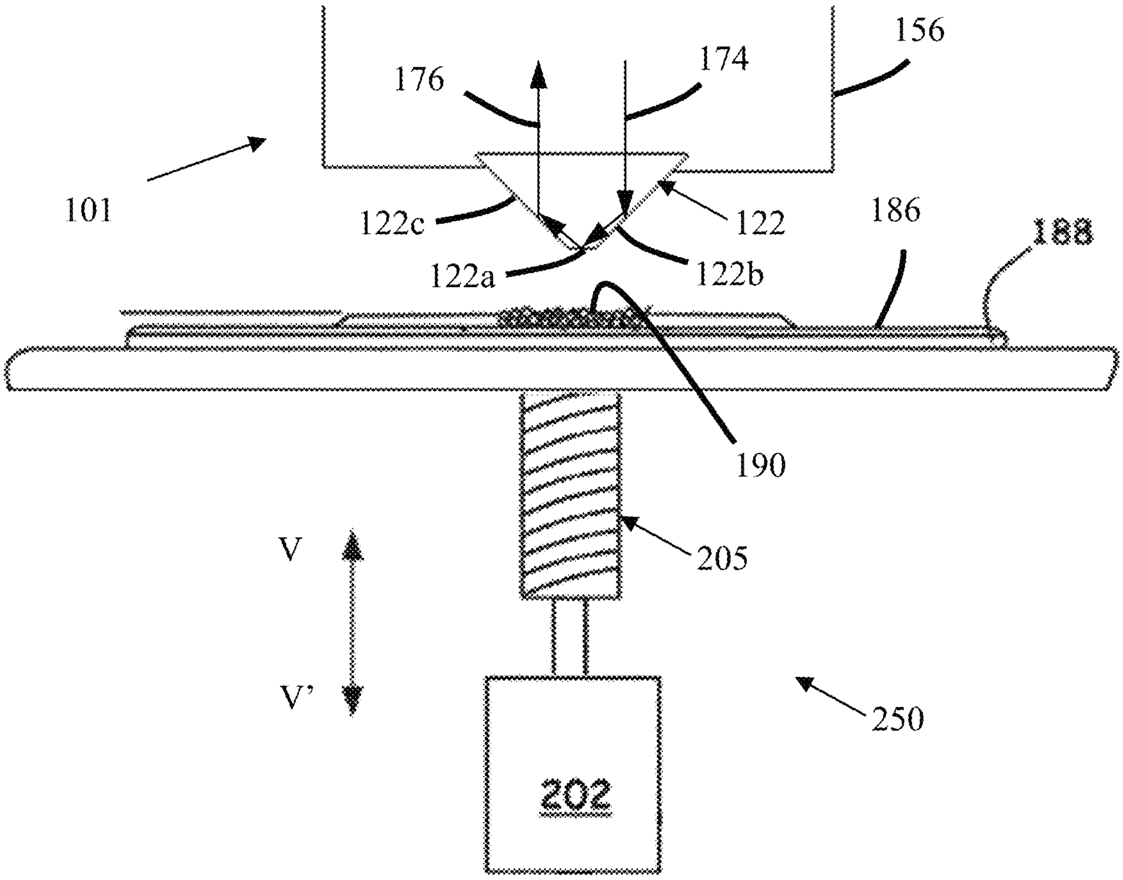
FIG. 4 illustrates a side schematic view of a portion of an ATR measurement system, according to an aspect of this disclosure.

FIG. 4 illustrates a side schematic view of a stage or platform 186 and the internally reflective element 122, according to an aspect of this disclosure. The stage 186 can be positioned adjacent to (e.g., below) the optical assembly 101 and can be configured to support the sample material 190 thereon. The internally reflective element 122 can include the contact surface 122*a* positioned to contact the sample 190. As illustrated, the sample 190 can include a powder that is denoted by circles. It will be appreciated that the sample 190 can include a solid or a liquid. Light from the source 102 can enter the internally reflective element 122 and reflect off of a surface 122*b* toward the contact surface 122*a*, and can leave the internally reflective element 122 by reflecting off of a surface 122*c*.

An edge of the internally reflective element 122 opposite to the contact surface 122*a* can be supported (e.g., from above with respect to the platform 186) and mounted either directly or indirectly to the enclosure 156. The internally reflective element 122 can be mounted rigidly such that movement of the internally reflective element 122 can also cause the optical assembly 101 to move. A coating (not shown), such as a metal (e.g., gold), can be applied to the internally reflective element 122 to enable stable coupling to the bottom of the enclosure 156, which can further provide support to the internally reflective element 122 (e.g., from above). Support provided by the enclosure 156 can allow the internally reflective element 122 to withstand significant applied forces during operation without being displaced from its mounting position.

A force assembly 250 can be connected to the stage 186 (e.g., from below with respect to the optical assembly 101. The force assembly 250 can include an actuator 202 and a translation member 205. The actuator 202 can include, for example, a motor (e.g., a DC motor) or a solenoid, an electromagnetic solenoid, or other type of force actuator (e.g., a piezo-electric driven mechanism, a linear motor, a rotary motor, a pneumatic or hydraulic actuator, etc.) that can be moved in a controlled manner. The translation member 205 can be connected to the stage 186 to control a movement of the stage 186 in vertical directions V and V', and/or rotational directions (not labeled). The translation member 205 can include a screw mechanism, a cam, or other mechanism to control linear and/or rotational motion of the stage 186. In an aspect, the stage 186 and sample 190 can be positioned adjacent to (e.g., vertically below) the internally reflective element 122.

During interrogation, an operator can control the actuator 202 to cause the stage 186 to translate in the vertical direction V such that the sample 190 contacts the contact surface 122*a* of the internally reflective element 122. The stage 186 can be controlled to raise and/or rotate into position. When the sample 190 is in contact with the contact surface 122*a*, at least one of the stage 186 and the internally reflective element 122 can apply a force onto the sample 190. The movement of the stage 186 can provide intimate contact between the contact surface 122*a* and the sample material 190 to enable efficient coupling of the evanescent wave and to improve a signal-to-noise ratio in measurements of reflected radiation beam 176. The enclosure 156 of the optical assembly 101 can ensure that the internally reflective element 122 remains in the same position on the stage 186.

The applied contact force by the stage 186 and/or the internally reflective element 122 onto the sample 190 can be a desired fixed force that is a user-selectable force, or a desired force controlled through feedback from the spectrometer based on a spectrometer signature of the sample 190. For example, the user can select a fixed force to apply, and the stage 186 can be controlled to apply the fixed force to the sample 190. Alternatively, the force applied to the sample 190 by the stage 186 and/or the internally reflective element 122 can depend on feedback by, for example, the light detector 132 (see FIG. 3) at a detection end of an optical beam path. As the force is being applied to the sample 190, the optical assembly 101 can simultaneously and continuously query a signal strength provided by the light detector 132. If the signal strength (e.g. a sample spectroscopic signature strength) provides a reasonable signal, the stage 186 can be controlled to stop and the force being applied to the sample 190 can be maintained. If the signal is not reasonable, the stage 186 can be continued to increase a force and/or pressure can be applied to the sample 190 until a maximum allowable force is applied or until an acceptable signal strength is achieved. This operation allows the stage 186 to stop moving as soon as there is enough contact force and/or pressure for a reasonable signal. It will be appreciated that other operations (e.g., movement of the internally reflective element) can be used to apply the force and/or pressure to the sample 190.

Figure 5:
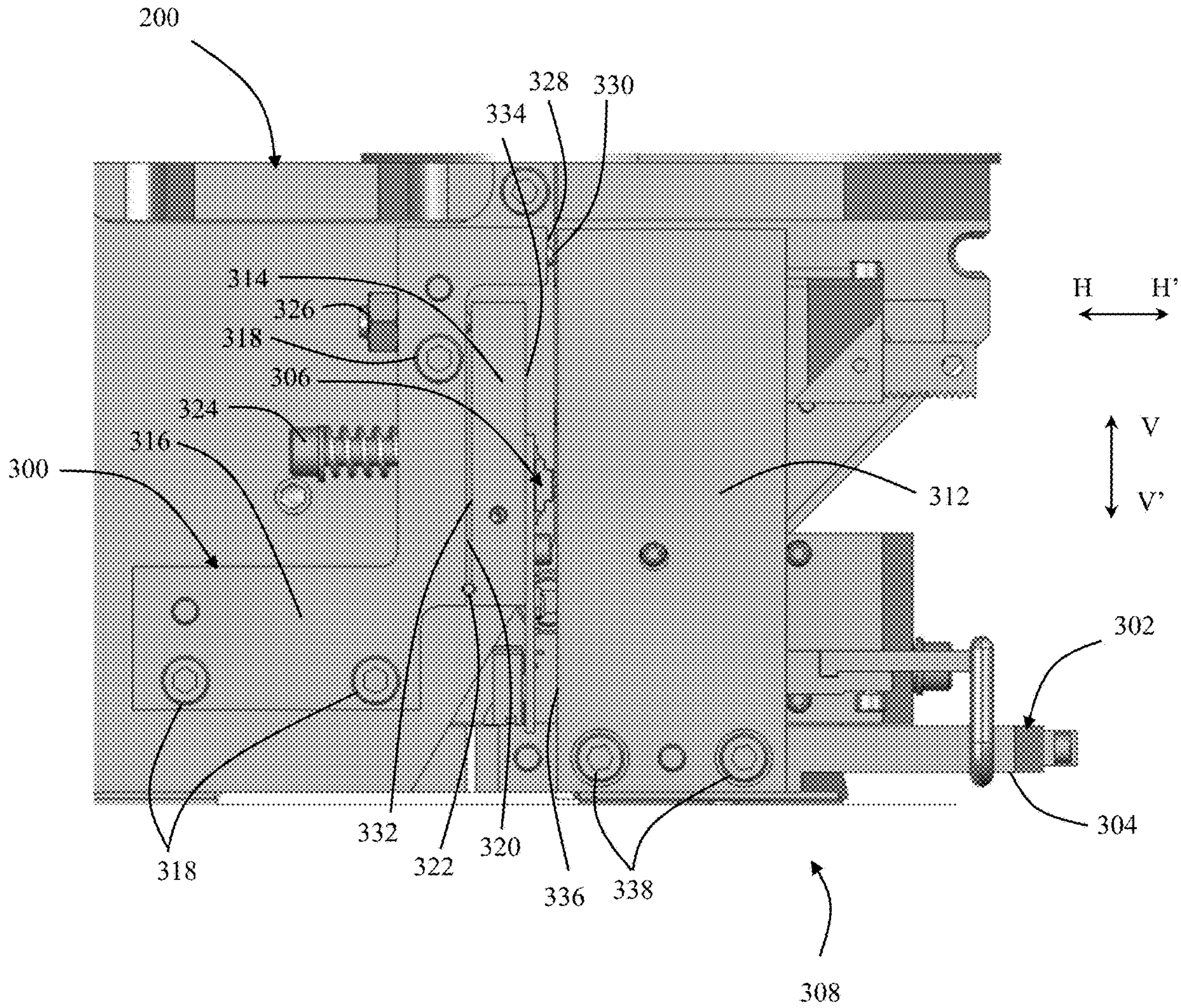
FIG. 5 illustrates a close-up side view of a load measurement assembly of the ATR measurement system shown in FIG. 1, according to an aspect of this disclosure.

FIG. 5 illustrates a close-up side view of the load measurement assembly 300 connected to the chassis 200, according to an aspect of this disclosure. The load measurement assembly 300 can be further connected to a nose assembly 302. The nose assembly 302 can include a plate member 304 that is rigidly connected to the chassis 200. The connection between the nose assembly 302 and the chassis 200 can define a cantilevered connection. The plate member 304 can extend from the chassis 200 in a direction substantially perpendicular to the vertical directions V and V'. The plate member 304 can be configured to deflect in the vertical directions V and V'. The plate member 304 can comprise a steel, aluminum, titanium, composite, or polymer material. The plate member 304 can be rigidly fixed to and at least partially support the optical assembly 101. The optical assembly 101 and the internally reflective element 122 can define a fixed constant load adjacent to (e.g., above) the sample 190. It will be appreciated that the plate member 304 can include more than one plate, a beam, multiple beams, and/or other structure configured to support the optical assembly 101 and also configured to deflect based on a force and/or a pressure applied to the internally reflective element 122.

Figure 6:
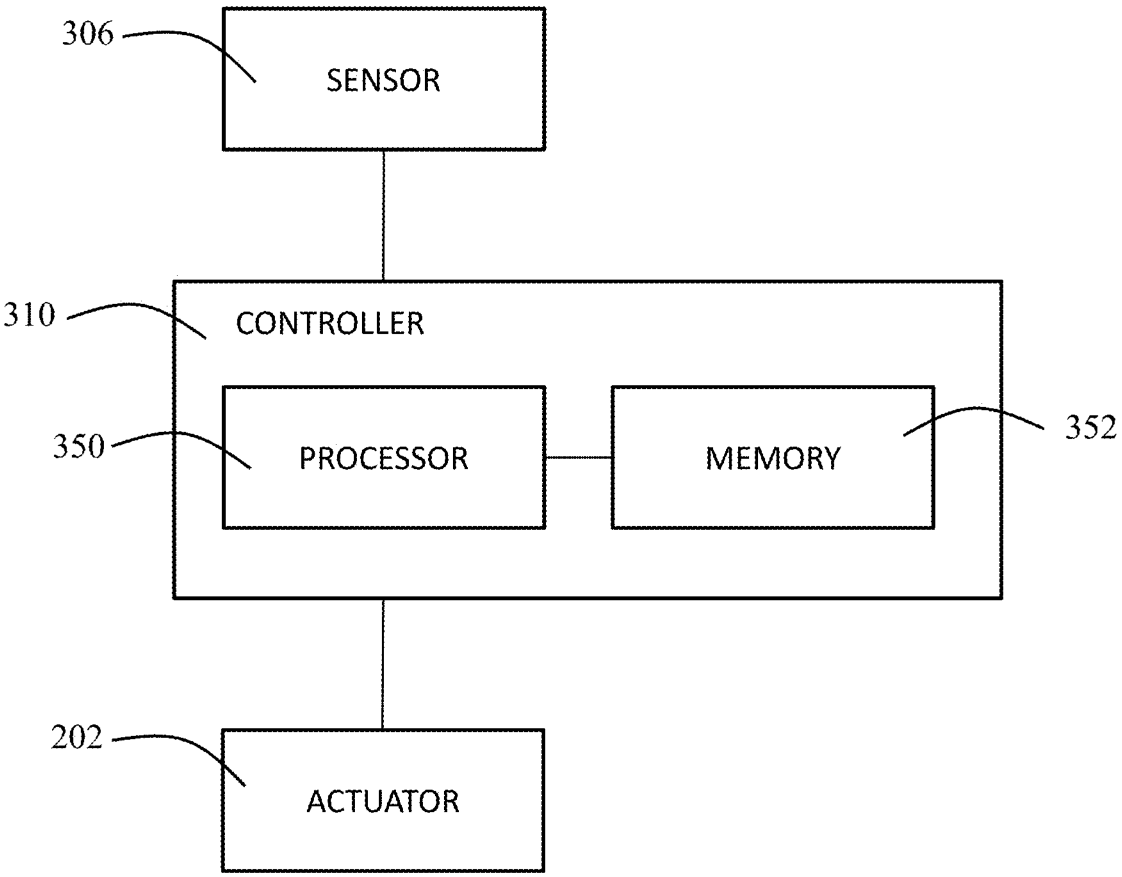
FIG. 6 illustrates a schematic of a controller, according to an aspect of this disclosure.

The load measurement assembly 300 can include a sensor 306, a deflection assembly 308, and a controller 310 (see FIG. 6). The deflection assembly 308 can be mounted to the chassis 200. The sensor 306 can be mounted to the deflection assembly 308. The controller 310 can be located on chassis 200 or other structure of the ATR measurement system 100. Alternatively, the controller 310 can be located remotely from the measurement system 100 and configured to communicate with the measurement system 100 via a communications interface (not shown). At least a portion of the deflection assembly 308 can be configured to deflect based on the force and/or pressure applied to the sample 190 by the internally reflective element 122 and/or the stage 186. The sensor 306 can be configured to detect the deflection of the deflection assembly 308, as further described below. The sensor 306 can be further configured to provide a signal indicative of the deflection of the deflection assembly 308 to the controller 310. The controller 310 can be configured to determine the force and/or pressure applied to the sample 190 based on the signal indicative of the deflection received from the sensor 306.

The deflection assembly 308 can include a projection member 312, a hinged beam 314, and a support member 316. It will be appreciated that the deflection assembly 308 can also include the plate member or beam 304, or other structure configured to facilitate the load measurement described herein. The support member 316 can be fixedly connected to the chassis 200 via fasteners 318. The fasteners 318 can include, for example, screws, rivets, clamps, and/or other types of fasteners. The support member 316 can include a hinge support surface 320 configured to connect a hinge 322 thereon. The support member 316 can include a first aperture and a second aperture (not visible in figures) that extend through (or at least partially through) the support member 316 to the hinge support surface 320. In an aspect, each of the first and second apertures can extend in substantially horizontal directions H and H'. The horizontal directions H and H' are substantially perpendicular to the vertical directions V and V'. The first aperture can be configured to receive a hinged beam retention element 324. The hinged beam retention element 324 can be configured to adjust a position of the hinged beam 314, as further described below. The second aperture can be configured to receive a first bearing element 326. The first bearing element 326 can be configured to substantially prevent rotational movement of the hinged beam 314, as further described below.

The support member 316 can further include a projection support surface 328 that defines a third aperture (not visible). The third aperture can be configured to receive a second bearing element 330. The second bearing element 330 can be configured to substantially prevent rotation of the projection member 312, as further described below. In an aspect, the projection support surface 328 can be substantially parallel to the hinge support surface 320.

The hinged beam 314 can include a rear hinge surface 332 and a front hinge surface 334. In an aspect, the rear hinge surface 332 can be substantially parallel to the front hinge surface 334. The hinge rear surface 332 can be connected to the hinge 322 such that the hinged beam is hingedly connected to the support member 316. The hinged beam 314 can be configured to rotate relative to the support member 316 about the hinge 322. The hinge 322 can include, for example, a pin joint or other type of hinge. It will be appreciated that the hinge 322 can include (or be replaced by) another component configured to allow rotation, such as, for example, a flex beam, a flex element, or other like component. In an aspect, the rotation of the hinged beam 314 about the hinge 320 can be substantially perpendicular to the vertical directions V and V'. During operation, the rear hinge surface 332 can be configured to abut against the first bearing element 326 and/or the hinged beam retention element 324 connected to the support member 316.

The sensor 306 can be connected to the front hinge surface 334 of the hinged beam 314, such that the sensor 306 is hingedly connected to the chassis 200 via the hinge 322. The sensor 306 can be configured to abut against a projection surface 336 of the projection member 312. The sensor 306 can be configured to sense a movement and/or a deflection of the projection member 312. The sensor can comprise a load cell, a strain gauge, a force sensitive resistor, or other type of force sensor or transducer configured to detect a load.

The projection member 312 can be fixedly connected to the plate member 304 of the nose assembly 302 via fasteners 338. The projection member 312 can extend from the plate member 304 at least partially in the vertical direction V. The projection member 312 can include the projection surface 336. The projection surface 336 can face the front hinge surface 334 hinged beam 314. During operation, movement and/or deflection of the projection surface 336 can be sensed by the sensor 306. The projection surface 336 can be further configured to abut against second bearing element 330 positioned within the support member 316, as further described below.

FIG. 6 illustrates a schematic of a controller 310, according to an aspect of this disclosure. As shown, the controller 310 can include a processor 350 and a memory 352. It will be appreciated that the controller 310 can also include the processor 134, the display 136, the storage unit 140, the communication interface 142, or other computing components. The memory 352 can store the data provided to the controller 310 from the sensor 306 indicative of the deflection of the deflection assembly 308. The memory 352 can also store executable code including algorithms to determine the force and/or pressure to apply to the sample 190 by the internally reflective element 122 and/or the stage 186. The memory 352 can include random access memory (RAM), read-only memory (ROM), or both. The controller 310 can be connected to the actuator 202 of the force assembly 200. The controller 310 can send signals to the actuator 202 to adjust the height of the stage 186 to affect the force and/or pressure applied to the sample 190.

Figure 7:
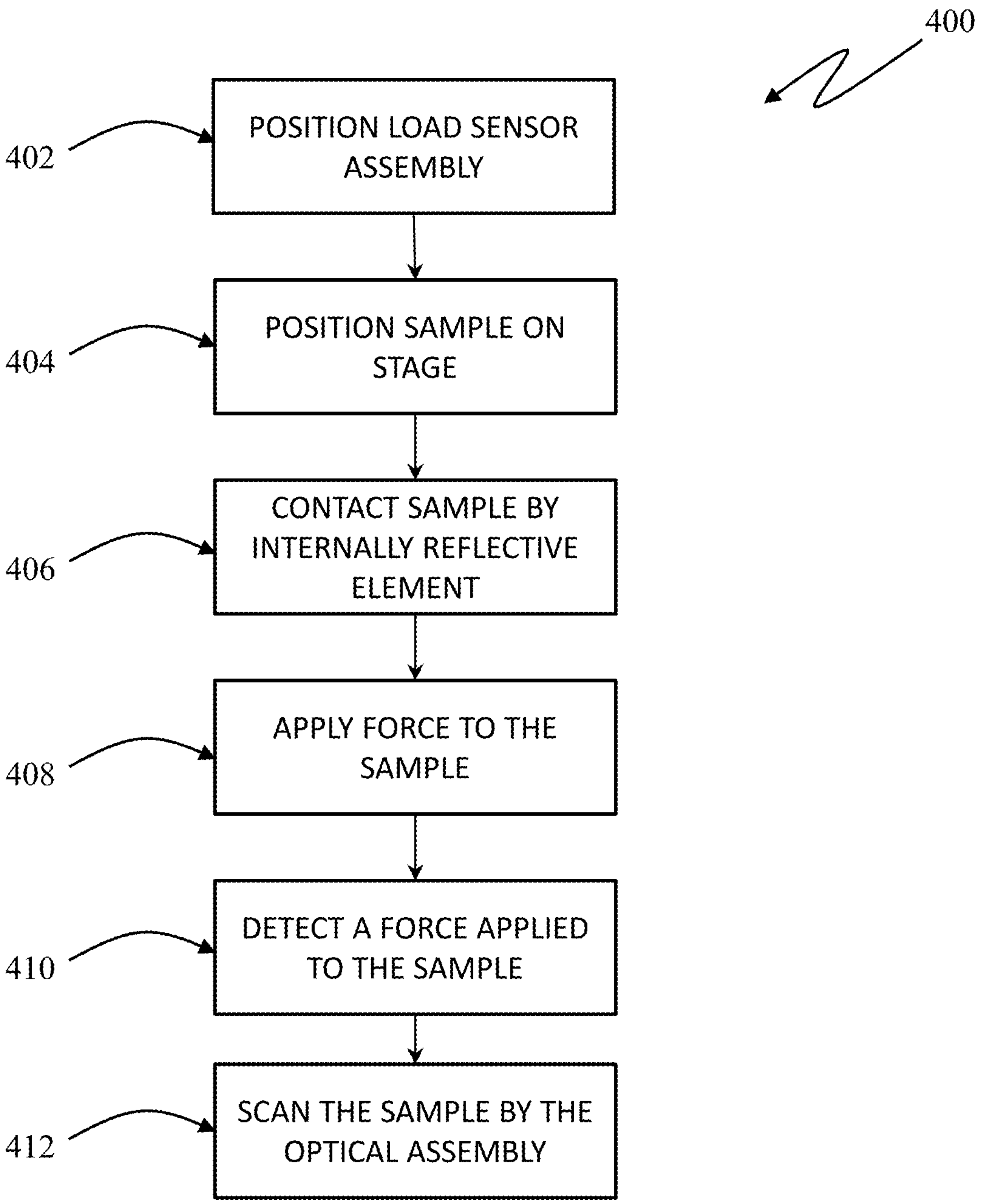
FIG. 7 illustrates a method of examining a sample with a measurement system, according to an aspect of this disclosure.

FIG. 7 illustrates a flowchart depicting a method 400 for examining the sample 190 with the ATR/FTIR measurement system 100, according to an aspect of this disclosure. At step 402, the load measurement assembly 300 can be positioned. With reference to FIG. 5, positioning the load measurement assembly 300 can include rotating the hinged beam 314 about the hinge 322 until the sensor 306 contacts the projection surface 336 of the projection member 312. The hinged beam 314 can be rotated using the first bearing element 326 to apply a force to the rear hinge surface 332. Once the sensor 306 is positioned, the first bearing element 326 can be locked to substantially prevent the hinged beam 314 from rotating in a direction away from the projection surface 336 of the projection member 312. The sensor 306 can be approximately zeroed out such that an initial force detected by the sensor is approximately zero.

It will be appreciated that when the optical assembly 101 and the internally reflective element 122 are fixedly connected to the nose assembly 302, the 304 can initially be deflected downward in the vertical direction V' due to the load (e.g. weight) of the optical assembly 101 and internally reflective element 122. To compensate for this initial deflection, the sensor 306 is positioned to contact the projection member 312 as previously described.

At step 404, the sample 190 can be positioned on the stage 186. In an aspect, the sample 190 can be placed toward a center of the stage 186 and at least partially below the internally reflective element 122. After the sample 190 is placed on the stage 186, at step 406, the stage 186 can be raised in the vertical direction V until the internally reflective element 122 contacts the sample 190. In an aspect, the sensor 306 can again (or initially) be approximately zeroed out after the internally reflective element 122 has contacted the sample 190.

At step 408, a contact force and/or pressure can be applied to the sample 190 by the stage 186 against the ATR tip 122*a* of the internally reflective element 122. The force and/or pressure can be applied to the sample 190 by the actuator 202 repositioning (e.g., raising) the stage 186. As described above, the contact force and/or pressure applied to the sample 190 can include a desired force and/or pressure that is user selected, controlled by signal strength feedback, or a force determined by another method. In an aspect, the sensor 306 can again (or initially) be approximately zeroed out after the internally reflective element 122 has applied an initial force on to the sample 190.

At step 410, the sensor 306 can detect an initial force and/or pressure applied to the sample 190 by the stage 186 and the internally reflective element 122. The detected initial force and/or pressure can correspond to the desired contact force and/or pressure described above. The detected initial force and/or pressure can be stored in the storage unit 140 and/or the memory 352 of the controller 310.

The force is detected by the sensor 306 based on a deflection of the optical assembly 101 and the internally reflective element 122 when the force is applied to the sample 190. The force applied to the sample by the internally reflective element 122 can be substantially in the vertical direction V'. As the height of the stage 186 is repositioned (e.g., raised) and the force applied to the sample 190 is increased, the internally reflective element 122 and the optical assembly 101 can deflect upward in the vertical direction V. The deflection of the optical assembly 101 in the vertical direction V can cause the nose assembly 302 to deflect in the vertical direction V. For example, the plate member 304 can rotate about the rigid connection with the chassis 200 (e.g. a cantilevered rotation/bend). The deflection of the plate member 304 can cause the projection member 312 to deflect in a direction that is angularly offset from the vertical direction V. In an aspect, the projection member deflects substantially in the horizontal direction H. The deflection of the projection member 312 can cause the projection surface 336 to apply a deflection force to the sensor 306. The deflection force detected by the sensor 306 can be used by the controller 310 to determine the force applied to the sample 190 by the stage 186 and the internally reflective element 122.

The sensor 306 can be configured to detect deflections of the projection surface 336 of up to approximately 30 microns. It will be appreciated that the sensor 306 can be configured to detect deflections greater than approximately 30 microns. For example, the sensor can be located at a different location on the measurement assembly 300 to measure a deflection of a different component or components of the measurement assembly 300. The deflection of the projection member 312 can be restricted by the second bearing element 330 on the support member 316. The second bearing element 330 can prevent damage to the sensor 306 based on too much projection member 312 deflection. For example, instead of the full force applied to the projection member 312 being applied to the sensor 306, at least part of the force applied is applied to the second bearing element 330.

At step 412, the sample 190 can be scanned by the optical assembly 101 to identify the sample 190. The scanning step includes directing source light from the light source 102 towards the contact surface 122*a* of the internally reflective element 122. The source light 102 can optically interact with the contact surface 122*a*. The source light 102 that optically interacts with the contact surface 122*a* is detected by the light detector 132.

As a result of applying force to the sample 190, the sample 190 can deform and/or degrade. The degradation can affect the contact force and/or pressure applied by the ATR tip 122*a* on the sample 190. For example, after a scan, the contact pressure can be reduced, thereby affecting measurements made during successive scans of the sample 190. The force applied to the sample 190 by the contact member 191 can be adjusted prior to the optical assembly 101 performing the successive scans, as described below.

After the scanning step, at step 412, the sensor 306 can detect a resulting force and/or pressure applied to the sample 190 by the ATR tip 122*a*. A signal indicative of the resulting force can be sent from the sensor 306 to the controller. The resulting force can be compared to the initial force to determine whether the resulting force is different than the initial force. The comparing step can be performed by the processor 350 or another processor of the controller 310. If the resulting force is different than the initial force, the controller 310 can send a signal to the actuator 202 to adjust the force applied to the sample 190. The actuator 202 can increase the height of the stage 186 to adjust the force applied to the sample 190 from the resulting force to the initial force.

The location of the sensor 306 on the chassis 200 can ensure that the load measurement is independent of the stage 186 travel. The load applied to the ATR can be substantially equivalent to the load on the sample 190. The stage 186 position, sample uniformity, sample weight, and stage control can all effect a load measurement. When the sensor 306 is located adjacent to (e.g., above) the stage 186 and the sample 190, and when the supporting weight of the hinged structure, including the optical assembly 101, is zeroed out, any force applied to the optical hinged structure in the vertical direction V can be immediately sensed by the sensor 306.

In an aspect, the alignment of the optics can be de-coupled from a preload of the sensor 306. The hinge 322 can be adjusted to bring the objective into alignment in the tilt axis. When this is complete, the sensor can be positioned (e.g., lowered) onto the load plate with a minimal preload. In this configuration, the sensor 306 can be substantially the only resistance to the ATR load.

It will be appreciated that the foregoing description provides examples of the disclosed system and method. However, it is contemplated that other implementations of the disclosure can differ in detail from the foregoing examples. For example, any of the embodiments disclosed herein can incorporate features disclosed with respect to any of the other embodiments disclosed herein. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

As one of ordinary skill in the art will readily appreciate from that processes, machines, manufacture, composition of matter, means, methods, or steps, presently existing or later to be developed that perform substantially the same function or achieve substantially the same result as the corresponding embodiments described herein can be utilized according to the present disclosure.

What is claimed:

1. An attenuated total reflectance (ATR) measurement system, comprising:

an optical assembly configured to mechanically transmit a force applied to a sample in a first direction, via an optical element of the optical assembly;

a deflection assembly, mechanically coupled with the optical assembly, configured to:

receive the force from the sample via the optical assembly; and redirect a portion of the force from the first direction to a second direction; and a sensor mounted to the deflection assembly, wherein the sensor is configured to:

detect force communicated in the second direction from the deflection assembly.

2. The ATR measurement system of claim 1, wherein the first direction comprises a vertical direction, and wherein the second direction is angularly offset from the first direction.

3. The ATR measurement system of claim 2, wherein the second direction is in a direction orthogonal to the first direction.

4. The ATR measurement system of claim 1, further comprising a chassis, and wherein the deflection assembly is mounted to the chassis.

5. The ATR measurement system of claim 4, wherein the deflection assembly is fixedly mounted to the chassis, such that the deflection assembly deflects when receiving the force from the optical assembly.

6. The ATR measurement system of claim 1, wherein the sensor is hingeably mounted to the deflection assembly.

7. The ATR measurement system of claim 1, wherein the sensor comprises a load cell or a load gauge.

8. The ATR measurement system of claim 1, wherein the sensor generates a signal indicative of the force received by the sensor.

9. The ATR measurement system of claim 1, wherein the sensor is configured to detect a deflection of the deflection assembly that is less than approximately 30 microns.

10. The ATR measurement system of claim 1, wherein the deflection assembly further comprises a retention element configured to translate in the second direction, thereby causing a repositioning of the sensor with respect to a projection surface of the deflection assembly.

11. A method, comprising:

mechanically transmitting, by a first assembly of an ATR measurement system, a force applied to a sample in a first direction, via an element of the first assembly;

receiving, by a deflection assembly of the ATR measurement system, mechanically coupled with the first assembly, the force from the sample via the first assembly;

redirecting, by the deflection assembly, a portion of the force from the first direction to a second direction; and detecting, by a sensor mounted to the deflection assembly, a force communicated in the second direction from the deflection assembly.

12. The method of claim 11, wherein the first direction comprises a vertical direction, and wherein the second direction is angularly offset from the first direction.

13. The method of claim 12, wherein the second direction is in a direction orthogonal to the first direction.

14. The method of claim 11, wherein the deflection assembly is mounted to a chassis.

15. The method of claim 14, wherein the deflection assembly is fixedly mounted to the chassis, such that the deflection assembly deflects when receiving the force from the first assembly.

16. The method of claim 11, wherein the sensor is hingeably mounted to the deflection assembly.

17. The method of claim 11, wherein the sensor comprises a load cell or a load gauge.

18. The method of claim 11, wherein the sensor generates a signal indicative of the force received by the sensor.

19. The method of claim 11, wherein the sensor is configured to detect a deflection of the deflection assembly that is less than approximately 30 microns.

20. The method of claim 11, wherein the deflection assembly further comprises a retention element configured to translate in the second direction, thereby causing a repositioning of the sensor with respect to a projection surface of the deflection assembly.

* * * * *